US008599957B2

(12) United States Patent
Peake et al.

(10) Patent No.: US 8,599,957 B2
(45) Date of Patent: Dec. 3, 2013

(54) METHOD AND SYSTEM FOR COMMUNICATING INFORMATION IN A DIGITAL SIGNAL

(75) Inventors: Michael Robert Peake, Mawson Lakes (AU); Mark Rice, Mawson Lakes (AU); Timothy Clifton Giles, Mawson Lakes (AU)

(73) Assignee: EMS Technologies, Inc., Norcross, GA (US)

( * ) Notice: Subject to any disclaimer, the term of this patent is extended or adjusted under 35 U.S.C. 154(b) by 381 days.

(21) Appl. No.: 11/913,871

(22) PCT Filed: May 15, 2006

(86) PCT No.: PCT/AU2006/000638
§ 371 (c)(1),
(2), (4) Date: Feb. 5, 2010

(87) PCT Pub. No.: WO2006/119583
PCT Pub. Date: Nov. 16, 2006

(65) Prior Publication Data
US 2010/0150263 A1 Jun. 17, 2010

(30) Foreign Application Priority Data

May 13, 2005 (AU) ................................ 2005902456

(51) Int. Cl.
*H04L 27/00* (2006.01)
(52) U.S. Cl.
USPC ............................................ 375/295; 455/91
(58) Field of Classification Search
USPC .............................. 375/295, 316, 340; 455/91
See application file for complete search history.

(56) References Cited

U.S. PATENT DOCUMENTS

| 6,304,624 | B1 | 10/2001 | Seki et al. |
| 6,389,003 | B1 | 5/2002 | Barroso |
| 6,643,275 | B1 | 11/2003 | Gustafsson et al. |

(Continued)

FOREIGN PATENT DOCUMENTS

| EP | 0 810 742 A2 | 12/1997 |
| EP | 1 037 407 A2 | 9/2000 |

(Continued)

OTHER PUBLICATIONS

Supplementary European Search Report for European Patent Application No. EP 06721508, mailed Feb. 11, 2011, 4 pages.

(Continued)

*Primary Examiner* — Curtis Odom
(74) *Attorney, Agent, or Firm* — Additon, Higgins, Pendleton & Ashe, P.A.

(57) ABSTRACT

The present invention relates to a communication method, system and signal, and in particular to a method and system for communicating information in a digital signal. It has particular application to satellite or terrestrial packet-based multi-user radio communication systems. A method for communicating information in a digital signal comprising data symbols is disclosed, wherein the information is encoded in a sequence characteristic of pilot symbols distributed amongst the data symbols, such that a receiver is able to determine the sequence characteristic and retrieve the transmitted information. The invention allows information to be encoded into a sequence characteristic of pilot, symbols, rather than relying on modulating such information onto the pilot symbols themselves. This allows a significantly larger number of pieces of information to be transmitted than hitherto possible, and the technique is more resistant to large frequency errors than prior techniques.

20 Claims, 3 Drawing Sheets

(56) References Cited

U.S. PATENT DOCUMENTS

| | | | |
|---|---|---|---|
| 6,807,517 B2 | 10/2004 | Chevalier et al. | |
| 7,027,464 B1* | 4/2006 | Nakahara et al. | 370/503 |
| 2001/0005406 A1 | 6/2001 | Mege et al. | |
| 2002/0031093 A1 | 3/2002 | Gfeller et al. | |
| 2002/0031189 A1 | 3/2002 | Hiben et al. | |
| 2002/0064182 A1 | 5/2002 | Hoffmann et al. | |
| 2003/0072395 A1 | 4/2003 | Jia et al. | |
| 2004/0114547 A1 | 6/2004 | Christodoulides et al. | |
| 2004/0228267 A1 | 11/2004 | Agrawal et al. | |
| 2004/0257981 A1* | 12/2004 | Ro et al. | 370/210 |
| 2004/0258014 A1* | 12/2004 | Ro et al. | 370/328 |
| 2005/0047496 A1 | 3/2005 | McIntire et al. | |
| 2005/0147024 A1* | 7/2005 | Jung et al. | 370/203 |
| 2005/0181816 A1* | 8/2005 | Han et al. | 455/522 |
| 2005/0201486 A1* | 9/2005 | Han et al. | 375/295 |
| 2006/0209927 A1* | 9/2006 | Khandekar et al. | 375/146 |

FOREIGN PATENT DOCUMENTS

| | | |
|---|---|---|
| EP | 1381180 A1 | 1/2004 |
| EP | 1 441 461 A1 | 7/2004 |
| GB | 2 404 533 A | 2/2005 |
| WO | WO 96/16492 A1 | 5/1996 |
| WO | WO 97/39557 A1 | 10/1997 |
| WO | WO 99/34521 A1 | 12/1997 |
| WO | WO 02/11331 A2 | 2/2002 |
| WO | WO 02/51186 A1 | 6/2002 |
| WO | WO 03/063405 A1 | 7/2003 |
| WO | WO 2004/042949 A1 | 5/2004 |
| WO | WO 2004/110012 A1 | 12/2004 |
| WO | WO 2004/114535 A1 | 12/2004 |
| WO | WO 2004/114536 A1 | 12/2004 |
| WO | WO 2005/018185 A1 | 2/2005 |
| WO | WO 2005/088882 A1 | 9/2005 |

OTHER PUBLICATIONS

International Search Report prepared by the Australian Patent Office on Jul. 25, 2006 for PCT/AU2006/000638; Applicant, Dpsace Pty Ltd et al.

International Preliminary Report on Patentability (Chapter II of the Patent Cooperation Treaty) prepared by the Australian Patent Office on Sep. 11, 2007 for PCT/AU2006/000638; Applicant, Dspace Pty Ltd et al.

European Patent Office, "Office Action", "from Foreign Counterpart of U.S. Application ", Sep. 11, 2012, pp. 1-8, Published in: EP.

* cited by examiner

METHOD AND SYSTEM FOR COMMUNICATING INFORMATION IN A DIGITAL SIGNAL

CROSS REFERENCE TO RELATED APPLICATION

This application is a national stage application under 35 U.S.C. 371 of PCT Application No. PCT/AU2006/000638 having an international filing date of May 15, 2006, which designated the United States, which PCT application claimed the benefit of Australian Application Serial No.2005902456, filed May 13, 2005, the entire disclosure of each of which is hereby incorporated herein by reference.

FIELD OF THE INVENTION

The present invention relates to a communication method and apparatus, and in particular to a method and apparatus for communicating information in a digital signal, and a method and apparatus for receiving and processing a digital signal. It has particular application to satellite or terrestrial packet-based multi-user radio communication systems.

BACKGROUND OF THE INVENTION

In this specification, where a document, act or item of knowledge is referred to or discussed, this reference or discussion is not an admission that the document, act or item of knowledge or any combination thereof was at the priority date part of common general knowledge, or known to be relevant to an attempt to solve any problem with which this specification is concerned.

In digital radio frequency transmission systems, the packets of user data to be transmitted are usually first encoded using a forward error-correction code such as a Turbo code. The encoded packets are then modulated as data symbols onto a carrier wave using one of a multitude of modulation schemes, such as quadrature amplitude modulation, binary phase shift keying or quadrature phase shift keying, and then transmitted to a receiver.

The receiver then processes the signal by demodulating the data symbols and decoding the encoded bits to thereby retrieve the user data. To assist in the efficient processing of the signal, the receiver estimates certain parameters of the channel over which the modulated carrier wave was transmitted in a process referred to as 'acquisition', involving analysis of the demodulated data symbols to estimate channel parameters before decoding is commenced.

Pilot symbols, with selected values that are known or can be precisely determined by the receiver, are conventionally included in the packets to assist the receiver in channel acquisition. Each packet may, for example, include a preamble (or postscript) comprising a sequence of pilot symbols (or 'unique word', UW) able to be readily analysed by the receiver and the result compared with known pilot symbol values stored in the receiver. This allows an accurate estimation of channel parameters such as the offsets of phase, time and frequency from an expected value. Mobile satellite communications can be subject to many noise effects as well as to fading effects, and the judicious use of pilot symbol techniques can significantly assist in minimising the problems associated with such effects. However, such methods can add considerable complexity to the signal acquisition and decoding process, resulting in slow performance and hence transmission delays. Excessive delay is incompatible with real time applications such as telephony and videoconferencing.

Examples of the use of such contiguous block preamble pilot symbol sequences in channel acquisition are discussed in U.S. Pat. Nos. 6,778,586, 6,711,208 and 6,625,459. In addition, U.S. Pat. No. 6,782,037 describes the use of such pilot symbol sequences to assist in distinguishing between users.

In an alternative technique, such as that described in U.S. Pat. No. 6,665,361, the pilot symbols are evenly distributed amongst the data symbols of each packet, rather than a placed as a block header at the beginning of the packet. This distribution scheme is said to assist in more accurate signal frequency and phase estimation, as well as allowing the tracking of a fading signal.

More recently, a technique for irregular fractal placement of pilot symbols amongst data symbols has been described in applicant's International Patent Application No. WO 2004/04929. Such a pilot symbol distribution allows for the efficient acquisition of the data packet's time of arrival and frequency, in a way that is particularly robust to phase noise. This relates to the fact that the pilot symbols, though irregularly spaced, are placed with a uniform density throughout the packet. Importantly, the pilot symbol pattern allows the spectrum of the pilot symbols to be narrower than that of the packet, thus reducing adjacent channel interference during acquisition.

In addition to information about channel parameters, a receiver may also require information about other parameters related to the signal in order for the signal to be efficiently processed. For example, knowledge of transmit parameters, such as the modulation scheme used to encode the data, type of (or rate of) forward error correction coding, user identification, transmitter location and power and type of antenna, can all assist the receiver to more efficiently process the received signal.

In the past, transmit parameters have been communicated to a receiver in a variety of ways. For example, in the case of code division multiple access (CDMA) systems, a user identification number is communicated to the receiver by allocating each user a mutually orthogonal unique code, whose 'adding together' in air can be detected by the receiver. Whilst CDMA systems are successful in allowing a receiver to identify multiple users who may be simultaneously accessing a single channel, only a relatively small amount of information can be encoded in this way. This means that it is not possible using CDMA to use such a technique to readily communicate to a receiver transmit parameters other than, say, user identification numbers.

Other approaches to this problem are discussed in U.S. Pat. No. 5,369,378, in which the phase-shift between adjacent pilot symbols is used to communicate information, and in EP-1 381 180, which describes a modulation scheme which can be varied in accordance with a parameter to be transmitted.

In other techniques, transmit parameters are communicated to the receiver in the actual values of the pilot symbols. U.S. Pat. No. 6,643,275 describes a system in which user identification information and the coding scheme is communicated to the receiver by way of the particular selection of pilot symbol preamble.

A more sophisticated system is described in International Patent Application No. WO 03/063405, in which the forward error-correction code rate is varied for each block of transmitted data. The actual value of the code rate of one of the blocks is communicated in a pilot symbol preamble, with that block containing data indicating the coding rate of a subsequent one or more blocks.

However, as with the CDMA approach discussed above, only a limited number of unique values can be communicated in this way, which consequently limits the type of information that can be meaningfully transmitted. Accordingly, it would be advantageous to provide an improved method and system for communicating information in a digital signal.

SUMMARY OF THE INVENTION

In accordance with a first aspect of the present invention there is provided a method for communicating information in a digital signal comprising data symbols, wherein the information is encoded in a sequence characteristic of pilot symbols distributed amongst the data symbols, such that a receiver is able to determine the sequence characteristic and retrieve the transmitted information.

The present invention is based on the surprising result that an additional, relatively small amount of 'kick-start' information (to be analysed before the data decoding begins) can be encoded in a sequence characteristic of pilot symbols that are transmitted to a receiver, rather than modulating such information onto the UW itself. Encoding the information in a sequence characteristic, rather than in a pilot symbol value or an orthogonal code as suggested in the prior art, provides a surprisingly robust solution (even under very high noise and interference conditions) and allows a significantly larger number of pieces of information to be transmitted than hitherto possible. Furthermore, the method is more resistant to large frequency errors than prior techniques, which are often poorly protected against such errors due to the particular distribution of pilot symbols.

The term 'sequence characteristic' signifies the position or relative position of the pilot symbols, and the information may be encoded in any suitable sequence characteristic of the pilot symbol distribution. In one embodiment, the information is encoded in the temporal position of the pilot symbols constituting the sequence. Encoding the information in the temporal position of the pilot symbols allows the receiver to simply and accurately determine the characteristic and thereby retrieve the information.

In this way, the method of the present invention may be employed to transmit information to the receiver that is to be utilised by the receiver in processing the transmitted data signals. For example the information may include transmit parameters, such as the modulation scheme used to encode the data symbols, type and/or rate of the error control coding, a user identity, transmitter location or antenna type, etc. In this way, the receiver may retrieve the transmit parameters by determining the characteristic of the pilot symbol sequence, which can then be utilised in processing the received data symbols.

The invention therefore provides a method of digital data transmission using pilot symbols, the transmission including one or more transmit parameters unrelated to the actual data to be transmitted, wherein a pilot symbol position modulation is used to encode the one or more transmit parameters.

The concept of using the temporal position of signal pulses as a method of transferring information is itself known (referred to as 'pulse-position modulation' or 'PPM'), being a technique occasionally employed for data transmission which finds application in areas such as model radio control and contact-less smart cards, in which very simple and lightweight receiver/decoder units are required. The position of each pulse can be used to represent, say, the angular position of an analogue control on the transmitter, and the number of pulses per frame determines the number of controllable channels available, which are demultiplexed by the receiver. PPM provides generally good performance in noise, but makes considerable demands in terms of bandwidth.

However, the prior art does not teach or suggest the idea of applying pulse position to modulate transmit parameters onto the UW. The inventors have found that the technique provides an unexpected performance advantage in facilitating fast receiving algorithms.

The pulse position modulation of the present invention is not used alone but applied by way of the placement of pilot symbols for the purpose of encoding transmit parameters. As the skilled reader will appreciate, the pilot symbols are place amongst a data sequence. With this in mind, it will be understood that the technique of the invention is very different to prior art techniques such as the encoding of transmit parameters by adding a DS-CDMA signal to another data-bearing DS-CDMA signal. In accordance with the present invention, the signals are not directly added to the data sequence, but interspersed therein. In other words, the data symbols are moved to make space for the pilot symbols. Furthermore, it will be appreciated that unlike the DS-CDMA example, the present invention involves the use of a different modulation scheme for the transmit parameters than that used for the data itself, effectively pulse position modulation for the transmit parameters, and phase shift keyed (PSK) modulation for the data.

In another embodiment of the invention, the information is encoded in the frequency of occurrence of the pilot symbols constituting the sequence. Encoding the information in the frequency of the pilot symbols can afford very efficient determination of the characteristic, thereby enabling very rapid information retrieval.

Preferably, the characteristic of the pilot symbol sequence in which the information is encoded is not the same as the characteristic in which the data symbols are encoded. For example, where the characteristic is the frequency of the pilot symbols, the data is not frequency modulated, but the data symbols are encoded with reference to, another characteristic, such as by way of phase modulation.

Preferably, the digital signal comprises a plurality of packets, wherein each packet contains both pilot symbols and data symbols and the distribution of pilot symbols amongst the data symbols is prescribed in accordance with the information to be encoded.

The pilot symbols may be distributed amongst the data symbols according to a fractal distribution pattern. Optimally, the pilot symbols are distributed amongst the data symbols according to an L-level fractal distribution pattern, where L is an integer greater than or equal to 2, wherein the pilot symbol positions are calculated according to the following formula:

$$P(i,T) = \Sigma_{l=1 \ to \ L} A_l \Pi_l(i_l) + D_l(i_l, T_l)$$

$P(i, T)$ is the $i^{th}$ position of the pilot symbols when the transmit parameters are T.

There are I pilot symbols being indexed with the index $i=0 \ldots I-1$.

I is factorised into $I_1, I_2 \ldots I_L$, i.e. $I_1 \times I_2 \times \ldots \times I_L = I$ L sub-indices are used $i_1 \ldots i_L$, to characterise the index i.

The sub-index $i_l$ has the range $0 \ldots I_l - 1$

The index i is uniquely defined by the sub-indices $i_1$ via the following formula $$i = (\Sigma_{l=1 \ to \ L-1} i_l \Pi_{m=(l+1) \ to \ L} I_m) + i_L$$

$\Pi$ indicates the product of terms.

$T_1, T_2, \ldots, T_L$ are components of the transmit parameters T.

$\Pi_1(i_1), \Pi_2(i_2), \ldots, \Pi_L(i_L)$ are lookup tables containing position values, all of which values (within a lookup table) are different.

$D_1(i_1, T_1), D_2(i_2, T_2), \ldots, D_L(i_L, T_L)$ are lookup tables containing dither values.

$A_1, A_2, \ldots, A_L$ are constants set in the design of the distribution. $A_L$ is generally set to 1.

The values of the pilot symbols may be calculated from the position of the pilot symbols.

In a preferred embodiment, the values of the pilot symbols are calculated accordance with the following formula:

$$V(i,T) = V_1(i_2, \ldots, i_L, T_1) V_2(i_1, i_3, \ldots, i_L, T_2) \ldots V_l(i_1, \ldots, i_{l-1}, i_{l+1}, \ldots, i_L, T_l) \ldots V_L(i_1, i_{L-1}, T_L)$$

$V(i,T)$ is the value of the $i^{th}$ pilot symbol when the transmit parameters are T.

$V_1(.), V_2(.) \ldots V_L(.)$ are lookup tables defined in the design of the UW.

Preferably, the information to be communicated represents one or more transmit parameters. The invention, then, provides a method of transmit parameter signalling, allowing the signalling to the receiver of 'kick-start' parameters.

According to a further aspect of the present invention there is provided a receiver method for retrieving information from a digital signal, comprising determining a sequence characteristic of pilot symbols distributed amongst the data symbols included in the signal to thereby retrieve the information encoded in the characteristic.

Preferably, the information encoded in the characteristic is decoded by means of a lookup table.

According to a further aspect of the present invention, there is provided a method for a receiver to process a digital signal, the signal comprising data symbols and a sequence of pilot symbols distributed amongst the data symbols, the method including the steps of:
  determining a characteristic of the sequence of pilot symbols to thereby retrieve information encoded in the characteristic, the information representing transmit parameters of the signal;
  retrieving channel estimates encoded in the values of the pilot symbols; and
  utilising the transmit parameters and channel estimates to process the signal.

According to yet a further aspect of the present invention, there is provided a transmitter apparatus for communicating information in a digital signal comprising data symbols, wherein the information is encoded in a sequence characteristic of pilot symbols distributed amongst the data symbols, such that a receiver is able to determine the sequence characteristic and retrieve the transmitted information.

According to a further aspect of the invention, there is provided a receiver apparatus for retrieving information from a digital signal, including means for determining a sequence characteristic of pilot symbols distributed amongst the data symbols included in the signal to thereby retrieve information encoded in the characteristic.

According to yet a further aspect of the present invention, there is provided a receiver apparatus for processing a digital signal, the signal comprising data symbols and a sequence of pilot symbols distributed amongst the data symbols, the apparatus including:
  means for determining a characteristic of the sequence of pilot symbols to thereby retrieve transmit parameters encoded in the characteristic;
  means for retrieving channel estimates encoded in the value of the pilot symbols; and
  means for utilising the transmit parameters and channel estimates to process the signal.

It will be appreciated that in digital communications there are two fundamental limits, noise and bandwidth. Pulse position modulation performs well when noise is a problem, but performs very badly when bandwidth limitations are important, thus reducing the practical application of this type of modulation. The pilot symbol position modulation scheme has been found to suitable in the context of the present invention because the data is modulated using a very bandwidth-efficient scheme.

Significantly, the scheme of the present invention lends itself to a very computationally efficient receiver.

BRIEF DESCRIPTION OF THE DRAWINGS

An embodiment of the invention will now be further explained and illustrated by reference to the accompanying drawings, in which.

DETAILED DESCRIPTION OF THE DRAWINGS

Figure 1:
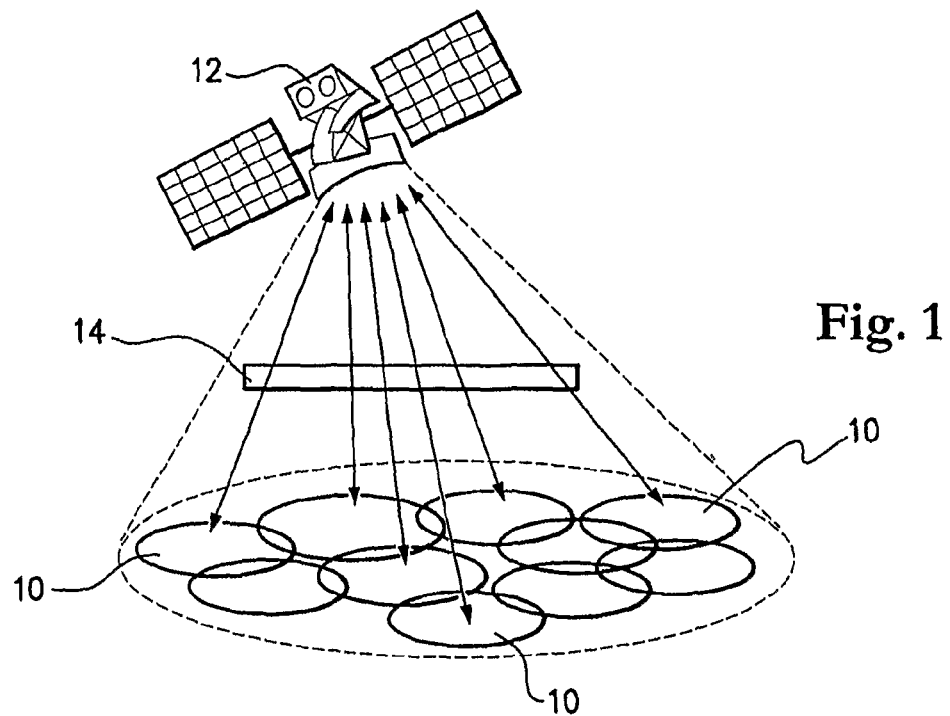
FIG. 1 is a illustration of the communications environment in which the present invention operates.

Turning to FIG. 1, a plurality of transmitters 10 are illustrated, each of which is in radio communication with a satellite receiver 12 over a shared communications channel 14. Access to the communications channel 14 is managed via a suitable multiplexing scheme such as TDMA, CDMA or FDMA.

In a conventional manner, each transmitter 10 takes user data such as voice or computer data, digitises the data if necessary, and breaks it into packets for communication to the receiver. Each transmitter 10 has a number of transmit parameters associated therewith, such as the modulation scheme used to encode data packets onto the communications channel 14, the type and/or rate of the forward error correction code scheme applied to the data packets before modulation, a user identification number such as that found on a SIM card, geographical location of the transmitter, transmitter power and the antenna type.

Figure 2:
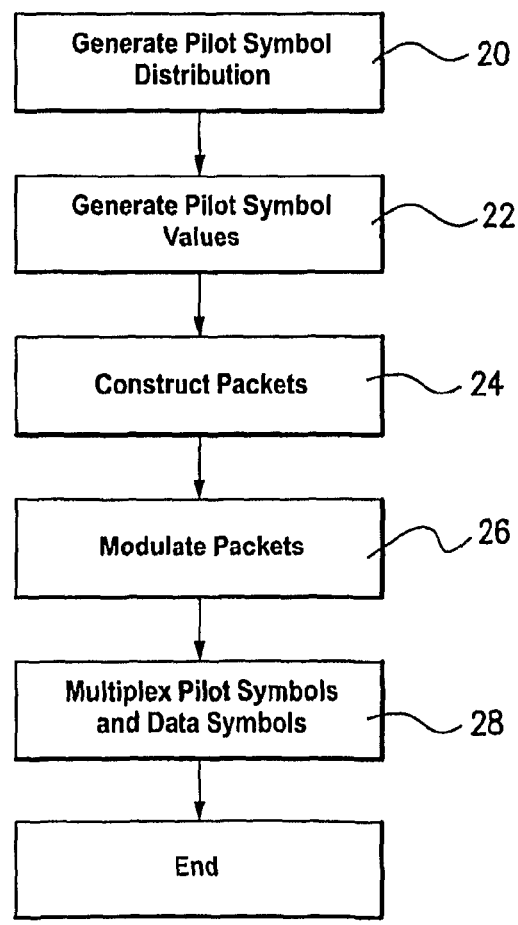
FIG. 2 is a flow chart of the steps carried out by the transmitter when communicating to the receiver.

When a transmitter 10 requires to communicate data to the receiver 12, the process steps illustrated in FIG. 2 are carried out. At step 20 the transmitter calculates a pilot symbol distribution pattern to be used in distributing the pilot symbols amongst the data symbols of each packet. The pilot symbol distribution pattern is a vector whose components store the positions within each packet that a pilot symbol will occupy. The pilot symbol distribution pattern is chosen from a set of distribution patterns, with the size of the set depending on the particular transmit parameters which are to be communicated to the receiver.

Step 20 may be carried out by use of a lookup table. The sequence of pilot symbols (or unique word UW) is divided into segments. The base pilot symbol B(i) distribution within each segment is contained in one lookup table, whilst another array contains a dither vector D(T) for each possible transmit parameter.

The dither vector D(T) required is looked up. A pilot symbol distribution P(i,T) is formed by adding the value of the element of the dither vector $D(i_1,T)$, for each segment to that segment of the base pilot symbol distribution. A simplified example of the generation of a set of pilot symbol distribution pattern follows:
B(i) [0 1 2; 10 12 13; 21 22 24]
D(T=0)=[0 1 3]
D(T=1)=[0 2 1]

An addition operation is performed between D(.) and B(.) to generate P(T=0) or P(T=1).

For instance T=0 may indicate that a ½ rate error control code was used while T=1 may indicate that a ¾ rate error control code was used.
P(T=0)=[0 1 2 11 13 14 24 25 27]
P(T=1)=[0 1 2 12 14 15 22 23 25]

An example of choosing a pilot symbol distribution from a set of distribution patterns follows:

EXAMPLE

The particular embodiment which follows was developed by the inventors of the present invention to allow the receiver to determine both channel parameters and transmit parameters efficiently and accurately.

A large set of pilot symbol patterns that can be distinguished by the receiver is provided, preferably generated by a pre-recorded lookup table as described above. Each packet is J symbols long with possible positions for the pilot symbols being $0 \ldots J-1$. There are I pilot symbols being indexed with $0 \ldots I-1$.

The transmit parameters to be communicated are represented as a vector of finite integers denoted by T.

The value (or modulation) of the $i^{th}$ pilot symbol is denoted by $V_i$ and the position of the $i^{th}$ pilot symbol is denoted by $P_i$, both of which are recorded in respective look up tables V and P, where $$V_i = V(i,T); P_i = P(i,T).$$

Figure 3:
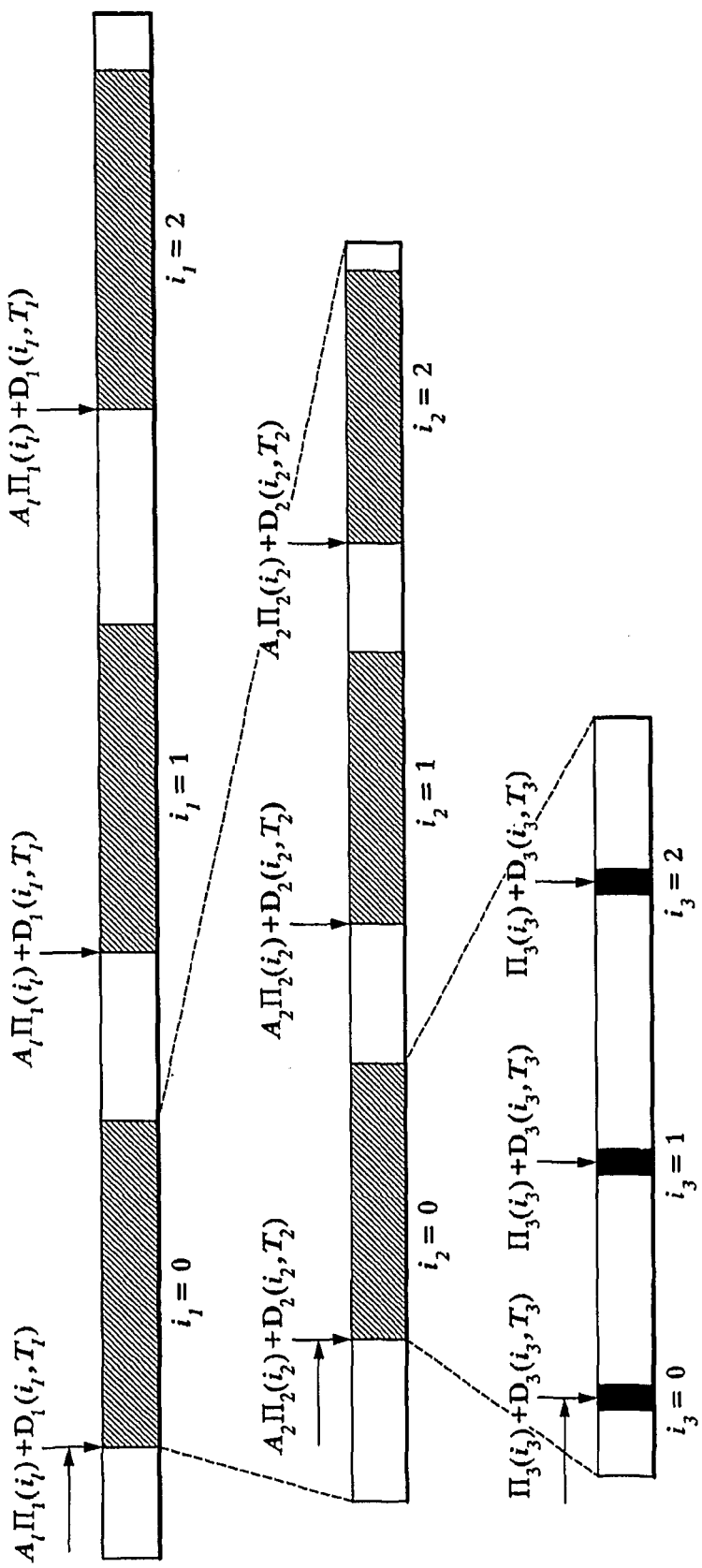
FIG. 3 is an illustration of a fractal pilot symbol distribution pattern.

The pilot symbol distribution patterns employed are based on a fractal distribution of pilot symbols amongst the data symbols to a selected number of fractal levels $L=2, 3, 4 \ldots$, as illustrated diagrammatically in FIG. 3.

Two-Level Technique for Position Lookup Table

In the case of a two-level fractal distribution position lookup table (L=2), I is first factorised into $I_1$ and $I_2$, so that:

$$I_1 \times I_2 = I$$

$i_2 = \text{rem}(i, I_2)$ (rem(x,y) is the remainder of x after division by y)
$i_1 = \text{floor}(i/I_2)$ (floor(x) is the highest integer which is less than or equal to x)
$T_1, T_2$ are components of the transmit parameters T
$\Pi_1(i_1), \Pi_2(i_2)$ are lookup tables containing position values, where all the values are different. This ensures that a position is only used once.
$D_1(i_1,T_1), D_2(i_2,T_2)$ are lookup tables containing dither values.
$A_1$ is a constant.

The lookup tables and constants are designed to ensure high accuracy and efficiency at the receiver.

The pilot symbol positions are generated by way of the following formula:

$$P(i,T) = A_1 \Pi_1(i_1) + \Pi_2(i_2) + D_1(i_1,T_1) + D_2(i_2,T_2)$$

Three-Level Technique for Position Lookup Table

In a similar manner, a pilot symbol distribution pattern lookup table for a three-level method (L=3) can be developed.

Again, I is factorised into $I_1$, $I_2$ and $I_3$, ie. $I_1 \times I_2 \times I_3 = I$
$i_3 = \text{rem}(i, I_3)$
$i_2 = \text{rem}(\text{floor}(i/I_3), I_2)$
$i_1 = \text{floor}(i/(I_2 \times I_3))$
$T_1, T_2$ and $T_3$ are components of the transmit parameters T.

$\Pi_1(i_1), \Pi_2(i_2), \Pi_3(i_3)$ are lookup tables containing position values, all of which values are different.
$D_1(i_1,T_1), D_2(i_2,T_2), D_3(i_3,T_3)$ are lookup tables containing dither values.
$A_1, A_2$ are constants.

The pilot symbol positions are generated by the formula:

$$P(i,T) = A_1 \Pi_1(i_1) + A_2 \Pi_2(i_2) + \Pi_3(i_3) + D_1(i_1,T_1) + D_2(i_2,T_2) + D_3(i_3,T_3)$$

By extrapolation, the method for any number of fractal levels L can be derived.

The formulae set out above require lookup tables of dither values D. Each lookup table D is composed of a set of dither vectors $D_{IT}$ one for each value of T. Each value of the lookup table is an integer in the range $0 \ldots d_{max}$. The difference vector $\Delta_{IT}$ contains the differences between all the elements in the dither vector $D_{IT}$ ie:

$$D_{IT} = [d_1, d_1, \ldots, d_{I(L-1)}];$$

$$\Delta_{IT} = [d_2-d_1, d_3-d_2, \ldots, d_{I(L-1)}-d_{I(L-1)-1}, d_3-d_1, d_4-d_2, \ldots, d_{I(L-1)}-d_{I(L-1)-2}, d_4-d_1, d_5-d_2, \ldots, d_{I(L-1)}-d_{I(L-1)-3}, \ldots, \ldots, d_{I(L-1)}-d_1]$$

The set of vectors $D_{IT}$ are chosen such that none of the dither differences (corresponding to the same two elements of $D_{IT}$) in $\Delta_{IT}$ have the same value.

An illustrative example follows:

$$d_{max}=4; \Delta_{IT}=[d_2-d_1, d_3-d_2, d_1-d_3]$$

$D_{11}=[0, 1, 3]$; $\Delta_{11}=[1, 2, -3]$
$D_{12}=[0, 3, 1]$; $\Delta_{12}=[3, -2, -1]$
$D_{13}=[1, 0, 3]$; $\Delta_{13}=[-1, 3, -2]$
$D_{14}=[1, 3, 0]$; $\Delta_{14}=[2, -3, 1]$
$D_{15}=[3, 0, 1]$; $\Delta_{15}=[-3, 1, -2]$
$D_{16}=[3, 1, 0]$; $\Delta_{16}=[-2, -1, 3]$
$D_{17}=[0, 4, 4]$; $\Delta_{17}=[4, 0, -4]$
$D_{18}=[4, 0, 4]$; $\Delta_{18}=[-4, 4, 0]$ Looking down the columns of the $\Delta$ vectors, it is clear that no values are equal; the first column is [1, 3, −1, 2, −3, −2, 4, −4].

Furthermore, if more dither vectors are required, then one column of the $\Delta$ vectors may be allowed to contain repeated values. If still more dither vectors are required then two columns may be allowed to contain repeated values, and so on.

Returning to FIG. 2, at step 22, the transmitter then calculates the particular values (or modulation) for each pilot symbol. The generation of the values lookup table. V can be done efficiently by multiplying lookup tables of lower dimensionality.

In the case of a two-level (L=2) fractal distribution:
$i_1, i_2, T_1, T_2$ are as defined above.
$V_1, V_2$ are lookup tables containing pilot symbol values.

The Pilot Symbol values are generated via the following formulae:

$$V(i,T) = V_1(i_2,T_1)V_2(i_1,T_2)$$

or the further simplified versions, $$V(i,T) = V_1(i_2,T_1)$$

or $$V(i,T) = V_2(i_1,T_2)$$

Similarly, in the case of a three-level distribution (L=3):
$i_1, i_2, i_3, T_1, T_2, T_3$ are as defined above.
$V_1, V_2, V_3$ are lookup tables containing pilot symbol values.

The pilot symbol values are generated by way of the following formula:

$$V(i,T) = V_1(i_2, i_3, T_1) V_2(i_1, i_3, T_2) V_3(i_1, i_2, T_3)$$

or any further simplified versions such as:

$$V(i,T) = V_1(i_2, T_1) V_2(i_3, T_2) V_3(i_1, T_3)$$

or:

$$V(i,T) = V_2(i_2, i_3) V_3(i_1, i_2, T_2)$$

etc.

Again, by extrapolation, the method for any number of levels L can be derived.

At step 24 packets are constructed by inserting data symbols into remaining positions within the packet not taken up by pilot symbols In this embodiment each data packet has the same number of pilot symbols. In alternative embodiments, synchronisation packets may be utilised which may have greater numbers of pilot symbols than the other data packets.

Each data packet may also have a different number of pilot symbols, with the particular number of pilot symbols in each data packet depending on the transmit parameters that are encoded.

Figure 4:
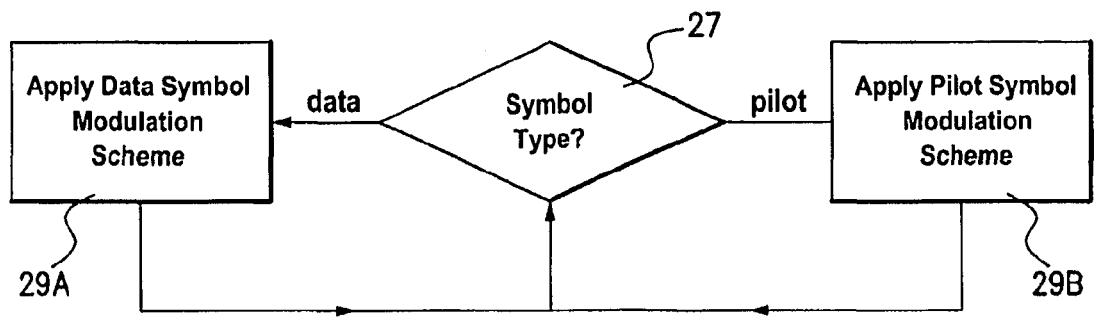
FIG. 4 is a flow chart of the modulation scheme of the present invention.

At step 26, the packets are modulated onto the carrier wave. Reference is also made to the flow chart of FIG. 4. At step 27 the transmitter first determines whether the next symbol to be modulated is a pilot symbol or a data symbol. In the event the symbol is a data symbol, at step 29A, the transmitter modulates the data symbol onto the carrier wave using a selected data symbol modulation scheme, such as for example, binary phase shift keying.

If the symbol is a pilot symbol, at step 29B, the transmitter modulates the pilot symbol onto the wave using a selected pulse position pilot symbol modulation scheme, being a different scheme to the data symbol modulation scheme.

At step 28 (FIG. 2) the modulated pilot symbols and data symbols are then multiplexed onto the communication channel and transmitted to the receiver. In this particular embodiment, the multiplexing is achieved by an addition process, by which the data packets are added to the pilot packets.

The process carried out by the receiver in receiving and processing the packets is described by reference to FIG. 5.

At step 31 the receiver first receives a transmitted signal from the transmitter 10. At step 33, the receiver generates a model of the received UW for all options of the transmit parameters and for all distortions of the transmitted UW, represented by the channel parameter options. The model UWs are compared to the received signal and a 'Score' is generated indicating how closely they match. There can be a large number of model UWs and it usual to use a suitably efficient algorithm in performing step 33. The algorithm typically stores the results of intermediate calculations which are used a number of times in generating the final results. This can be seen as somewhat analogous to a Fast Fourier Transform algorithm, which achieves the same result as a Fourier transform with less computation.

In this example of the invention, the transmit parameters are encoded in the temporal position of the pilot symbols, so the model of the received UW consists of pilot symbols at the expected temporal positions and zeros elsewhere. However, the pilot symbols could be modulated according to other schemes, such as frequency modulation, in which case the receiver determines the frequency of the pilot symbol sequence in order to extract the transmit parameters. In this example the Score is generated by performing a normalised correlation between the model UW and the received signal. Alternatively, other comparison metrics could be used.

At step 35 the best Score is chosen from the plurality of scores generated in step 33. The best Score has an associated transmit parameter and channel parameter vector. The parameters are passed to the signal decoding process, provided the Score exceeds a prescribed threshold value (step 37) indicating a sufficiently close match. Otherwise, (step 39) it is decided that no meaningful signal is present.

The transmit parameters encoded into a pilot symbol distribution pattern for communication to a receiver may include a unique user identification code, such as the code used in CDMA spread spectrum systems. This code can be used by the receiver (after extraction from the signal) to determine whether the signal should be decoded. It will be realised that this aspect of the invention results in an efficiency gain to the receiver, in that unwanted signals can be detected (and thus ignored by the receiver) without the need for substantial decoding.

In the event that the signal is to be decoded, the receiver (step 41) may utilise the values of the pilot symbols in the process of channel acquisition, such as described in WO03/063405.

Figure 5:
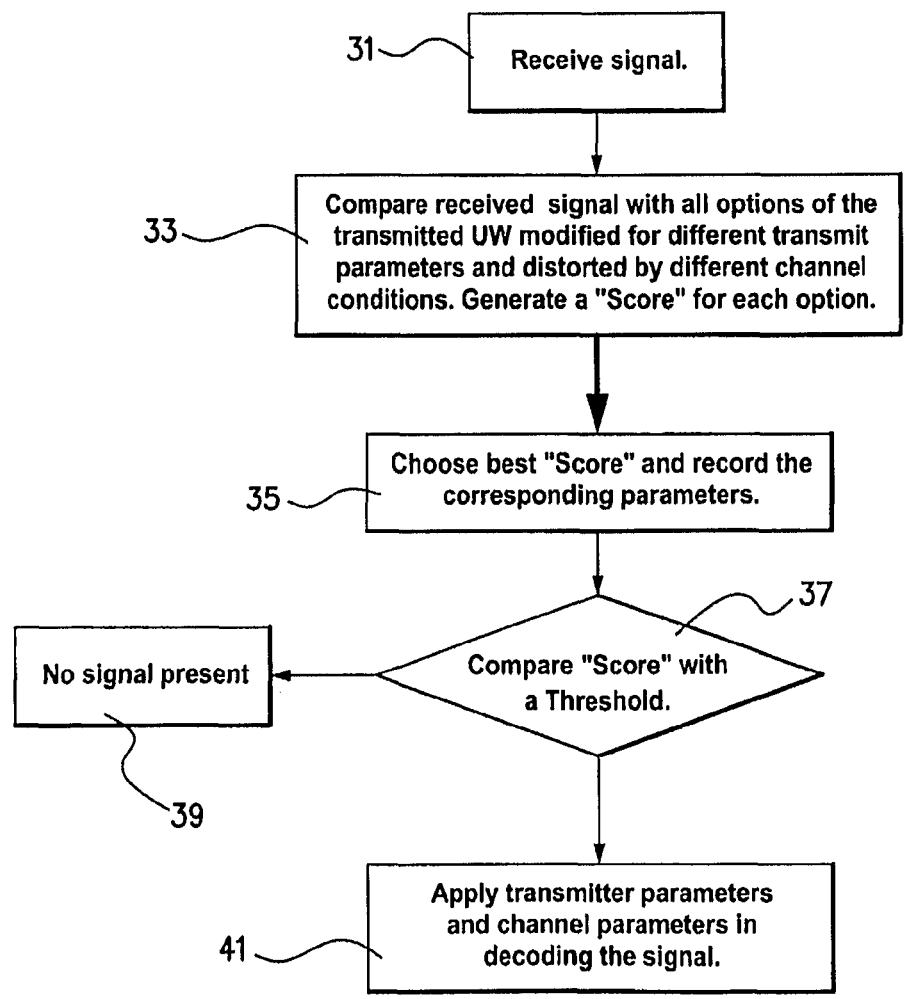
FIG. 5 is a flow chart of the steps carried out by the receiver in receiving and processing a transmitted signal.

In the implementation illustrated in FIG. 5, all transmit parameters and channel parameters are determined in a single step. It will be realised that the process of determining transmit parameters and channel parameters can be sub-divided into a series of steps in order to obtain a design suitable for the intended application. For example, one channel parameter (such as timing phase or fine timing) can be determined alone, before all other transmit and channel parameters are determined in a subsequent process step.

At step 41 the signal is ready to be decoded and the original user data extracted and processed. As noted above, one of the transmit parameters that can be communicated by the technique of the invention is the type of forward error correction coding used by the transmitter to encode the data. Suitably, this item of information is utilised by the receiver in choosing the correct decoding algorithm to apply to the received signal. It will again be realised that this allows the receiver to conveniently decode signals from a number of transmitters, each of which may use a different forward error correction code, and for the transmitter to seamlessly switch to and apply the correct decoding algorithm.

As discussed above, the characteristic of the pilot symbol distribution pattern in which the transmit parameters are encoded is not limited to temporal position. In another example, the frequency offset of the pilot symbols is used. The special case of using frequency offset as a method of encoding the transmit parameters can lead to significant improvement in the efficiency of the receiver algorithm.

The method is illustrated via the following formula:

$$V_k(i_k, T) = V'_k(i_k) \exp(2\pi j f_k T_j)$$

Where, $V_k(i_k, T)$ is one of the lookup tables used in generating the UW values, $V'_k(i_k)$ is a lookup table of pilot symbol values that is independent of T, $i_k$ is one of the aforementioned indices ($i_1, i_2 \ldots$), T is single integer component derived from the transmit parameters T, j is the square root of −1, exp(.) is the exponential function, and f is a design constant.

It is possible that the required number of Pilot Symbols I is a prime number or a number for which suitable factors cannot be found. The aforementioned methods can be used with a final step of removing some of the pilot symbols (in accordance with a lookup table), which can suitably modify the number of pilot symbols.

The attached appendix provides further detail regarding this particular technique of generating and using UW patterns. Pilot symbol distribution patterns with a three-level fractal structure were generated for use in modems. The Appendix sets out a 'Matlab' program used to generate one of these patterns, and an output from running the program, namely lookup tables as V(i,T), P(i,T).

The program demonstrates the case of:

$$T=(T1,T2); T1=1\ldots 8; T2=1\ldots 8;$$

$$P(i,T)=P(i,T1)$$

$$V(i,T)=V(i,T2)=V_2(i_1,i_3)V_3(i_1,i_2,T_2)$$

The formulae set out above in this description can be seen in the program, however the following should be noted:
Matlab cannot use zero as a matrix index, and '+1's have therefore been included.

The variables in the program are written in plain text, so: $I_1 \equiv I1; A_1 \equiv A1; \Pi_1 \equiv PI1; D1 \equiv D1$, etc.

The above example relates to the transmission of transmit parameters that the receiver may utilise in processing the signal. However it will be realised that the present invention could be utilised to communicate any type of information. The above example utilises a fractal distribution of pilot symbols to assist in data acquisition, but it will be recognised by the skilled reader that other types of distribution can be used in accordance with the present invention.

The word 'comprising' and forms of the word 'comprising' as used in this description and in the claims does not limit the invention claimed to exclude any variants or additions. Modifications and improvements to the invention will be readily apparent to those skilled in the art. Such modifications and improvements are intended to be within the scope of this invention.

APPENDIX

Program for Generating UW

```
function UWExample
%%%%%%%%%%%%%%%%%%%%%%%%%%%%%%%%%%%%%%%%%%%%
% FILENAME   : UWExample.m
% AUTHOR     : Tim Giles
% PROJECT    : Start TPS Patent
% START DATE : 3 March 2005
% DESCRIPTION: This program generates a UW pattern based on the
%              three level method for position look-up
%
%
%%%%%%%%%%%%%%%%%%%%%%%%%%%%%%%%%%%%%%%%%%%%
% This part of the program simply outputs the UW Pattern in a nice format
% Output the position look up table
for T1=1:8
  for T2=1:8
    [ V P ] = UWGenerate(T1,T2);
    DisplayString=sprintf('P(%1d, %1d) = [',T1,T2);
    for i=1:size(P,2)
      DisplayString = strcat(DisplayString,sprintf('%3d',P(i)));
    end %i
    DisplayString = strcat(DisplayString,']');
    disp(DisplayString);
  end %T2
end %T1
```

APPENDIX-continued

Program for Generating UW

```
% Output the values look up table
for T1=1:8
  for T2=1:8
    [ V P ] = UWGenerate(T1,T2);
    DisplayString=sprintf('V(%1d, %1d) = [',T1,T2);
    for i=1:size(V,2)
      if imag(V(i))==0 % V has only 4 options 1 -1 j -j
        DisplayString = strcat(DisplayString,sprintf(' %2d ',real(V(i))));
      else
        if imag(V(i))==1
          DisplayString = strcat(DisplayString,' j ');
        else
          DisplayString = strcat(DisplayString,' -j ');
        end %if
      end %if
    end %i
    DisplayString = strcat(DisplayString,']');
    disp(DisplayString);
  end %T2
end %T1
% The function UWGenerate creates the part of the poisition look-up
% table P and the values look up table V for the specified transmit
% parameters T1 T2
function [ V, P ] = UWGenerate(T1,T2)
P=[ ]; % Pilot Symbol Position Vector
V=[ ]; % Pilot Symbol Value Vector
% Below are the parameters needed to define the UW look-up tables
I1=3;
I2=3;
I3=3;
I=I1*I2*I3;
A1    =    30;
A2    =    5;
PI1   =    [ 0 1 2];
PI2   =    [ 0 1 3];
PI3   =    [ 0 1 3];
D1(:,1) =  [ 0 ; 1 ; 3 ];
D1(:,2) =  [ 0 ; 3 ; 1 ];
D1(:,3) =  [ 1 ; 0 ; 3 ];
D1(:,4) =  [ 1 ; 3 ; 0 ];
D1(:,5) =  [ 3 ; 0 ; 1 ];
D1(:,6) =  [ 3 ; 1 ; 0 ];
D1(:,7) =  [ 0 ; 4 ; 4 ];
D1(:,8) =  [ 4 ; 0 ; 4 ];
D2    =    [ 0 0 0];
D3    =    [ 0 0 0];

V2 = [ -j 1 1 ; j 1 -1 ; 1 j -j ];
V3(:,:,1) = [1 1 1 ; 1 1 1; 1 1 1];
V3(:,:,2) = [1 1 1 ; 1 1 1; 1 1 -1];
V3(:,:,3) = [1 1 1 ; 1 1 1; 1 -1 1];
V3(:,:,4) = [1 1 1 ; 1 1 1; 1 -1 -1];
V3(:,:,5) = [1 1 1 ; 1 1 -1; 1 1 1];
V3(:,:,6) = [1 1 1 ; 1 1 -1; 1 1 -1];
V3(:,:,7) = [1 1 1 ; 1 1 -1; 1 -1 1];
V3(:,:,8) = [1 1 1 ; 1 1 -1; 1 -1 -1];
% The look-up table is generated using the formulas mentioned in the
% Patent
for i=0:(I-1)
  i3=rem(i,I3);
  i2=rem(floor(i/I3),I2);
  i1=floor(i/(I2*I3));
  % The 3 Level formula for generating the position look up table
  P(i+1)= A1*PI1(i1+1)+A2*PI2(i2+1)+PI3(i3+1)+D1(i1+1,T1)+
  D2(i2+1)+D3(i3+1);
  % The formula for generating the values look up table
  V(i+1)= V2(i1+1,i3+1)*V3(i1+1,i2+1,T2);
end %i
```

Program Output

P(1, 1) = [ 0 1 3 5 6 8 15 16 18 31 32 34 36 37 39 46 47 49 63 64 66 68 69 71 78 79 81]
P(1, 2) = [ 0 1 3 5 6 8 15 16 18 31 32 34 36 37 39 46 47 49 63 64 66 68 69 71 78 79 81]

-continued

Program Output

P(1, 3) = [ 0 1 3 5 6 8 15 16 18 31 32 34 36 37 39 46 47 49 63 64 66 68 69 71 78 79 81]
P(1, 4) = [ 0 1 3 5 6 8 15 16 18 31 32 34 36 37 39 46 47 49 63 64 66 68 69 71 78 79 81]
P(1, 5) = [ 0 1 3 5 6 8 15 16 18 31 32 34 36 37 39 46 47 49 63 64 66 68 69 71 78 79 81]
P(1, 6) = [ 0 1 3 5 6 8 15 16 18 31 32 34 36 37 39 46 47 49 63 64 66 68 69 71 78 79 81]
P(1, 7) = [ 0 1 3 5 6 8 15 16 18 31 32 34 36 37 39 46 47 49 63 64 66 68 69 71 78 79 81]
P(1, 8) = [ 0 1 3 5 6 8 15 16 18 31 32 34 36 37 39 46 47 49 63 64 66 68 69 71 78 79 81]
P(2, 1) = [ 0 1 3 5 6 8 15 16 18 33 34 36 38 39 41 48 49 51 61 62 64 66 67 69 76 77 79]
P(2, 2) = [ 0 1 3 5 6 8 15 16 18 33 34 36 38 39 41 48 49 51 61 62 64 66 67 69 76 77 79]
P(2, 3) = [ 0 1 3 5 6 8 15 16 18 33 34 36 38 39 41 48 49 51 61 62 64 66 67 69 76 77 79]
P(2, 4) = [ 0 1 3 5 6 8 15 16 18 33 34 36 38 39 41 48 49 51 61 62 64 66 67 69 76 77 79]
P(2, 5) = [ 0 1 3 5 6 8 15 16 18 33 34 36 38 39 41 48 49 51 61 62 64 66 67 69 76 77 79]
P(2, 6) = [ 0 1 3 5 6 8 15 16 18 33 34 36 38 39 41 48 49 51 61 62 64 66 67 69 76 77 79]
P(2, 7) = [ 0 1 3 5 6 8 15 16 18 33 34 36 38 39 41 48 49 51 61 62 64 66 67 69 76 77 79]
P(2, 8) = [ 0 1 3 5 6 8 15 16 18 33 34 36 38 39 41 48 49 51 61 62 64 66 67 69 76 77 79]
P(3, 1) = [ 1 2 4 6 7 9 16 17 19 30 31 33 35 36 38 45 46 48 63 64 66 68 69 71 78 79 81]
P(3, 2) = [ 1 2 4 6 7 9 16 17 19 30 31 33 35 36 38 45 46 48 63 64 66 68 69 71 78 79 81]
P(3, 3) = [ 1 2 4 6 7 9 16 17 19 30 31 33 35 36 38 45 46 48 63 64 66 68 69 71 78 79 81]
P(3, 4) = [ 1 2 4 6 7 9 16 17 19 30 31 33 35 36 38 45 46 48 63 64 66 68 69 71 78 79 81]
P(3, 5) = [ 1 2 4 6 7 9 16 17 19 30 31 33 35 36 38 45 46 48 63 64 66 68 69 71 78 79 81]
P(3, 6) = [ 1 2 4 6 7 9 16 17 19 30 31 33 35 36 38 45 46 48 63 64 66 68 69 71 78 79 81]
P(3, 7) = [ 1 2 4 6 7 9 16 17 19 30 31 33 35 36 38 45 46 48 63 64 66 68 69 71 78 79 81]
P(3, 8) = [ 1 2 4 6 7 9 16 17 19 30 31 33 35 36 38 45 46 48 63 64 66 68 69 71 78 79 81]
P(4, 1) = [ 1 2 4 6 7 9 16 17 19 33 34 36 38 39 41 48 49 51 60 61 63 65 66 68 75 76 78]
P(4, 2) = [ 1 2 4 6 7 9 16 17 19 33 34 36 38 39 41 48 49 51 60 61 63 65 66 68 75 76 78]
P(4, 3) = [ 1 2 4 6 7 9 16 17 19 33 34 36 38 39 41 48 49 51 60 61 63 65 66 68 75 76 78]
P(4, 4) = [ 1 2 4 6 7 9 16 17 19 33 34 36 38 39 41 48 49 51 60 61 63 65 66 68 75 76 78]
P(4, 5) = [ 1 2 4 6 7 9 16 17 19 33 34 36 38 39 41 48 49 51 60 61 63 65 66 68 75 76 78]
P(4, 6) = [ 1 2 4 6 7 9 16 17 19 33 34 36 38 39 41 48 49 51 60 61 63 65 66 68 75 76 78]
P(4, 7) = [ 1 2 4 6 7 9 16 17 19 33 34 36 38 39 41 48 49 51 60 61 63 65 66 68 75 76 78]
P(4, 8) = [ 1 2 4 6 7 9 16 17 19 33 34 36 38 39 41 48 49 51 60 61 63 65 66 68 75 76 78]
P(5, 1) = [ 3 4 6 8 9 11 18 19 21 30 31 33 35 36 38 45 46 48 61 62 64 66 67 69 76 77 79]
P(5, 2) = [ 3 4 6 8 9 11 18 19 21 30 31 33 35 36 38 45 46 48 61 62 64 66 67 69 76 77 79]
P(5, 3) = [ 3 4 6 8 9 11 18 19 21 30 31 33 35 36 38 45 46 48 61 62 64 66 67 69 76 77 79]
P(5, 4) = [ 3 4 6 8 9 11 18 19 21 30 31 33 35 36 38 45 46 48 61 62 64 66 67 69 76 77 79]
P(5, 5) = [ 3 4 6 8 9 11 18 19 21 30 31 33 35 36 38 45 46 48 61 62 64 66 67 69 76 77 79]
P(5, 6) = [ 3 4 6 8 9 11 18 19 21 30 31 33 35 36 38 45 46 48 61 62 64 66 67 69 76 77 79]
P(5, 7) = [ 3 4 6 8 9 11 18 19 21 30 31 33 35 36 38 45 46 48 61 62 64 66 67 69 76 77 79]
P(5, 8) = [ 3 4 6 8 9 11 18 19 21 30 31 33 35 36 38 45 46 48 61 62 64 66 67 69 76 77 79]
P(6, 1) = [ 3 4 6 8 9 11 18 19 21 31 32 34 36 37 39 46 47 49 60 61 63 65 66 68 75 76 78]
P(6, 2) = [ 3 4 6 8 9 11 18 19 21 31 32 34 36 37 39 46 47 49 60 61 63 65 66 68 75 76 78]
P(6, 3) = [ 3 4 6 8 9 11 18 19 21 31 32 34 36 37 39 46 47 49 60 61 63 65 66 68 75 76 78]
P(6, 4) = [ 3 4 6 8 9 11 18 19 21 31 32 34 36 37 39 46 47 49 60 61 63 65 66 68 75 76 78]
P(6, 5) = [ 3 4 6 8 9 11 18 19 21 31 32 34 36 37 39 46 47 49 60 61 63 65 66 68 75 76 78]
P(6, 6) = [ 3 4 6 8 9 11 18 19 21 31 32 34 36 37 39 46 47 49 60 61 63 65 66 68 75 76 78]
P(6, 7) = [ 3 4 6 8 9 11 18 19 21 31 32 34 36 37 39 46 47 49 60 61 63 65 66 68 75 76 78]
P(6, 8) = [ 3 4 6 8 9 11 18 19 21 31 32 34 36 37 39 46 47 49 60 61 63 65 66 68 75 76 78]
P(7, 1) = [ 0 1 3 5 6 8 15 16 18 34 35 37 39 40 42 49 50 52 64 65 67 69 70 72 79 80 82]
P(7, 2) = [ 0 1 3 5 6 8 15 16 18 34 35 37 39 40 42 49 50 52 64 65 67 69 70 72 79 80 82]
P(7, 3) = [ 0 1 3 5 6 8 15 16 18 34 35 37 39 40 42 49 50 52 64 65 67 69 70 72 79 80 82]
P(7, 4) = [ 0 1 3 5 6 8 15 16 18 34 35 37 39 40 42 49 50 52 64 65 67 69 70 72 79 80 82]
P(7, 5) = [ 0 1 3 5 6 8 15 16 18 34 35 37 39 40 42 49 50 52 64 65 67 69 70 72 79 80 82]
P(7, 6) = [ 0 1 3 5 6 8 15 16 18 34 35 37 39 40 42 49 50 52 64 65 67 69 70 72 79 80 82]
P(7, 7) = [ 0 1 3 5 6 8 15 16 18 34 35 37 39 40 42 49 50 52 64 65 67 69 70 72 79 80 82]
P(7, 8) = [ 0 1 3 5 6 8 15 16 18 34 35 37 39 40 42 49 50 52 64 65 67 69 70 72 79 80 82]
P(8, 1) = [ 4 5 7 9 10 12 19 20 22 30 31 33 35 36 38 45 46 48 64 65 67 69 70 72 79 80 82]
P(8, 2) = [ 4 5 7 9 10 12 19 20 22 30 31 33 35 36 38 45 46 48 64 65 67 69 70 72 79 80 82]
P(8, 3) = [ 4 5 7 9 10 12 19 20 22 30 31 33 35 36 38 45 46 48 64 65 67 69 70 72 79 80 82]
P(8, 4) = [ 4 5 7 9 10 12 19 20 22 30 31 33 35 36 38 45 46 48 64 65 67 69 70 72 79 80 82]
P(8, 5) = [ 4 5 7 9 10 12 19 20 22 30 31 33 35 36 38 45 46 48 64 65 67 69 70 72 79 80 82]
P(8, 6) = [ 4 5 7 9 10 12 19 20 22 30 31 33 35 36 38 45 46 48 64 65 67 69 70 72 79 80 82]
P(8, 7) = [ 4 5 7 9 10 12 19 20 22 30 31 33 35 36 38 45 46 48 64 65 67 69 70 72 79 80 82]
P(8, 8) = [ 4 5 7 9 10 12 19 20 22 30 31 33 35 36 38 45 46 48 64 65 67 69 70 72 79 80 82]
V(1, 1) = [ −j 1 1 −j 1 1 −j 1 1 j 1 −1 j 1 −1 j 1 −1 1 j −j 1 j −j 1 j −j]
V(1, 2) = [ −j 1 1 −j 1 1 −j 1 1 j 1 −1 j 1 −1 j 1 −1 1 j −j 1 j −j −1 −j j]
V(1, 3) = [ −j 1 1 −j 1 1 −j 1 1 j 1 −1 j 1 −1 j 1 −1 −1 −j j 1 j −j 1 j −j]
V(1, 4) = [ −j 1 1 −j 1 1 −j 1 1 j 1 −1 j 1 −1 j 1 −1 −1 −j j 1 j −j −1 −j j]
V(1, 5) = [ −j 1 1 −j 1 1 −j 1 1 j 1 −1 j 1 −1 −j −1 1 1 j −j 1 j −j 1 j −j]
V(1, 6) = [ −j 1 1 −j 1 1 −j 1 1 j 1 −1 j 1 −1 −j −1 1 1 j −j 1 j −j −1 −j j]
V(1, 7) = [ −j 1 1 −j 1 1 −j 1 1 j 1 −1 j 1 −1 −j −1 1 −1 −j j 1 j −j 1 j −j]
V(1, 8) = [ −j 1 1 −j 1 1 −j 1 1 j 1 −1 j 1 −1 −j −1 1 −1 −j j 1 j −j −1 −j j]
V(2, 1) = [ −j 1 1 −j 1 1 −j 1 1 j 1 −1 j 1 −1 j 1 −1 1 j −j 1 j −j 1 j −j]
V(2, 2) = [ −j 1 1 −j 1 1 −j 1 1 j 1 −1 j 1 −1 j 1 −1 1 j −j 1 j −j −1 −j j]
V(2, 3) = [ −j 1 1 −j 1 1 −j 1 1 j 1 −1 j 1 −1 j 1 −1 −1 −j j 1 j −j 1 j −j]
V(2, 4) = [ −j 1 1 −j 1 1 −j 1 1 j 1 −1 j 1 −1 j 1 −1 −1 −j j 1 j −j −1 −j j]
V(2, 5) = [ −j 1 1 −j 1 1 −j 1 1 j 1 −1 j 1 −1 −j −1 1 1 j −j 1 j −j 1 j −j]
V(2, 6) = [ −j 1 1 −j 1 1 −j 1 1 j 1 −1 j 1 −1 −j −1 1 1 j −j 1 j −j −1 −j j]
V(2, 7) = [ −j 1 1 −j 1 1 −j 1 1 j 1 −1 j 1 −1 −j −1 1 −1 −j j 1 j −j 1 j −j]
V(2, 8) = [ −j 1 1 −j 1 1 −j 1 1 j 1 −1 j 1 −1 −j −1 1 −1 −j j 1 j −j −1 −j j]

-continued

| Program Output |
| --- |
| V(3, 1) = [ −j 1 1 −j 1 1 −j 1 1 j 1 −1 j 1 −1 j 1 −1 1 j −j 1 j −j 1 j −j] |
| V(3, 2) = [ −j 1 1 −j 1 1 −j 1 1 j 1 −1 j 1 −1 j 1 −1 1 j −j 1 j −j −1 −j j] |
| V(3, 3) = [ −j 1 1 −j 1 1 −j 1 1 j 1 −1 j 1 −1 j 1 −1 1 j −j −1 −j j 1 j −j] |
| V(3, 4) = [ −j 1 1 −j 1 1 −j 1 1 j 1 −1 j 1 −1 j 1 −1 1 j −j −1 −j j −1 −j j] |
| V(3, 5) = [ −j 1 1 −j 1 1 −j 1 1 j 1 −1 j 1 −1 −j −1 1 1 j −j 1 j −j 1 j −j] |
| V(3, 6) = [ −j 1 1 −j 1 1 −j 1 1 j 1 −1 j 1 −1 −j −1 1 1 j −j 1 j −j −1 −j j] |
| V(3, 7) = [ −j 1 1 −j 1 1 −j 1 1 j 1 −1 j 1 −1 −j −1 1 1 j −j −1 −j j 1 j −j] |
| V(3, 8) = [ −j 1 1 −j 1 1 −j 1 1 j 1 −1 j 1 −1 −j −1 1 1 j −j −1 −j j −1 −j j] |
| V(4, 1) = [ −j 1 1 −j 1 1 −j 1 1 j 1 −1 j 1 −1 j 1 −1 1 j −j 1 j −j 1 j −j] |
| V(4, 2) = [ −j 1 1 −j 1 1 −j 1 1 j 1 −1 j 1 −1 j 1 −1 1 j −j 1 j −j −1 −j j] |
| V(4, 3) = [ −j 1 1 −j 1 1 −j 1 1 j 1 −1 j 1 −1 j 1 −1 1 j −j −1 −j j 1 j −j] |
| V(4, 4) = [ −j 1 1 −j 1 1 −j 1 1 j 1 −1 j 1 −1 j 1 −1 1 j −j −1 −j j −1 −j j] |
| V(4, 5) = [ −j 1 1 −j 1 1 −j 1 1 j 1 −1 j 1 −1 −j −1 1 1 j −j 1 j −j 1 j −j] |
| V(4, 6) = [ −j 1 1 −j 1 1 −j 1 1 j 1 −1 j 1 −1 −j −1 1 1 j −j 1 j −j −1 −j j] |
| V(4, 7) = [ −j 1 1 −j 1 1 −j 1 1 j 1 −1 j 1 −1 −j −1 1 1 j −j −1 −j j 1 j −j] |
| V(4, 8) = [ −j 1 1 −j 1 1 −j 1 1 j 1 −1 j 1 −1 −j −1 1 1 j −j −1 −j j −1 −j j] |
| V(5, 1) = [ −j 1 1 −j 1 1 −j 1 1 j 1 −1 j 1 −1 j 1 −1 1 j −j 1 j −j 1 j −j] |
| V(5, 2) = [ −j 1 1 −j 1 1 −j 1 1 j 1 −1 j 1 −1 j 1 −1 1 j −j 1 j −j −1 −j j] |
| V(5, 3) = [ −j 1 1 −j 1 1 −j 1 1 j 1 −1 j 1 −1 j 1 −1 1 j −j −1 −j j 1 j −j] |
| V(5, 4) = [ −j 1 1 −j 1 1 −j 1 1 j 1 −1 j 1 −1 j 1 −1 1 j −j −1 −j j −1 −j j] |
| V(5, 5) = [ −j 1 1 −j 1 1 −j 1 1 j 1 −1 j 1 −1 −j −1 1 1 j −j 1 j −j 1 j −j] |
| V(5, 6) = [ −j 1 1 −j 1 1 −j 1 1 j 1 −1 j 1 −1 −j −1 1 1 j −j 1 j −j −1 −j j] |
| V(5, 7) = [ −j 1 1 −j 1 1 −j 1 1 j 1 −1 j 1 −1 −j −1 1 1 j −j −1 −j j 1 j −j] |
| V(5, 8) = [ −j 1 1 −j 1 1 −j 1 1 j 1 −1 j 1 −1 −j −1 1 1 j −j −1 −j j −1 −j j] |
| V(6, 1) = [ −j 1 1 −j 1 1 −j 1 1 j 1 −1 j 1 −1 j 1 −1 1 j −j 1 j −j 1 j −j] |
| V(6, 2) = [ −j 1 1 −j 1 1 −j 1 1 j 1 −1 j 1 −1 j 1 −1 1 j −j 1 j −j −1 −j j] |
| V(6, 3) = [ −j 1 1 −j 1 1 −j 1 1 j 1 −1 j 1 −1 j 1 −1 1 j −j −1 −j j 1 j −j] |
| V(6, 4) = [ −j 1 1 −j 1 1 −j 1 1 j 1 −1 j 1 −1 j 1 −1 1 j −j −1 −j j −1 −j j] |
| V(6, 5) = [ −j 1 1 −j 1 1 −j 1 1 j 1 −1 j 1 −1 −j −1 1 1 j −j 1 j −j 1 j −j] |
| V(6, 6) = [ −j 1 1 −j 1 1 −j 1 1 j 1 −1 j 1 −1 −j −1 1 1 j −j 1 j −j −1 −j j] |
| V(6, 7) = [ −j 1 1 −j 1 1 −j 1 1 j 1 −1 j 1 −1 −j −1 1 1 j −j −1 −j j 1 j −j] |
| V(6, 8) = [ −j 1 1 −j 1 1 −j 1 1 j 1 −1 j 1 −1 −j −1 1 1 j −j −1 −j j −1 −j j] |
| V(7, 1) = [ −j 1 1 −j 1 1 −j 1 1 j 1 −1 j 1 −1 j 1 −1 1 j −j 1 j −j 1 j −j] |
| V(7, 2) = [ −j 1 1 −j 1 1 −j 1 1 j 1 −1 j 1 −1 j 1 −1 1 j −j 1 j −j −1 −j j] |
| V(7, 3) = [ −j 1 1 −j 1 1 −j 1 1 j 1 −1 j 1 −1 j 1 −1 1 j −j −1 −j j 1 j −j] |
| V(7, 4) = [ −j 1 1 −j 1 1 −j 1 1 j 1 −1 j 1 −1 j 1 −1 1 j −j −1 −j j −1 −j j] |
| V(7, 5) = [ −j 1 1 −j 1 1 −j 1 1 j 1 −1 j 1 −1 −j −1 1 1 j −j 1 j −j 1 j −j] |
| V(7, 6) = [ −j 1 1 −j 1 1 −j 1 1 j 1 −1 j 1 −1 −j −1 1 1 j −j 1 j −j −1 −j j] |
| V(7, 7) = [ −j 1 1 −j 1 1 −j 1 1 j 1 −1 j 1 −1 −j −1 1 1 j −j −1 −j j 1 j −j] |
| V(7, 8) = [ −j 1 1 −j 1 1 −j 1 1 j 1 −1 j 1 −1 −j −1 1 1 j −j −1 −j j −1 −j j] |
| V(8, 1) = [ −j 1 1 −j 1 1 −j 1 1 j 1 −1 j 1 −1 j 1 −1 1 j −j 1 j −j 1 j −j] |
| V(8, 2) = [ −j 1 1 −j 1 1 −j 1 1 j 1 −1 j 1 −1 j 1 −1 1 j −j 1 j −j −1 −j j] |
| V(8, 3) = [ −j 1 1 −j 1 1 −j 1 1 j 1 −1 j 1 −1 j 1 −1 1 j −j −1 −j j 1 j −j] |
| V(8, 4) = [ −j 1 1 −j 1 1 −j 1 1 j 1 −1 j 1 −1 j 1 −1 1 j −j −1 −j j −1 −j j] |
| V(8, 5) = [ −j 1 1 −j 1 1 −j 1 1 j 1 −1 j 1 −1 −j −1 1 1 j −j 1 j −j 1 j −j] |
| V(8, 6) = [ −j 1 1 −j 1 1 −j 1 1 j 1 −1 j 1 −1 −j −1 1 1 j −j 1 j −j −1 −j j] |
| V(8, 7) = [ −j 1 1 −j 1 1 −j 1 1 j 1 −1 j 1 −1 −j −1 1 1 j −j −1 −j j 1 j −j] |
| V(8, 8) = [ −j 1 1 −j 1 1 −j 1 1 j 1 −1 j 1 −1 −j −1 1 1 j −j −1 −j j −1 −j j] |

The invention claimed is:

1. A method for communicating a selected transmission parameter in a digital signal modulated according to a single carrier modulation technique and comprising distinct data symbols and pilot symbols, the method comprising:
encoding the selected transmission parameter in a sequence characteristic of the pilot symbols distributed amongst the data symbols within a packet, the sequence characteristic being a function of the relative position of individual pilot symbols assigned to positions interleaved amongst the data symbols,
wherein the sequence characteristic is one of a plurality of patterns, each pattern associated with at least one of a plurality of transmission parameters, the sequence characteristic being independent of the modulation technique; and
wherein a receiver, upon receiving the digital signal is able to determine the pattern of the sequence characteristic for the packet and thereby retrieve the selected transmission parameter.

2. The method of claim 1, wherein the selected transmission parameter is encoded in the temporal position of the pilot symbols constituting the sequence.

3. The method of claim 1, wherein the selected transmission parameter is encoded in the frequency of occurrence of the pilot symbols constituting the sequence.

4. The method of claim 1, wherein the characteristic of the pilot symbol sequence in which the selected transmission parameter is encoded is not the same as the characteristic in which the data symbols are encoded.

5. The method of claim 1, wherein the digital signal comprises a plurality of packets, each packet containing both pilot symbols and data symbols, and the distribution of pilot symbols amongst the data symbols is prescribed in accordance with the selected transmission parameter to be encoded.

6. The method of claim 1, wherein the pilot symbols are distributed amongst the data symbols according to a fractal distribution pattern.

7. The method of claim 6, wherein the pilot symbols are distributed amongst the data symbols according to an L-level fractal distribution pattern, where L is an integer greater than or equal to 2, in which the pilot symbol positions are calculated according to the following formula:

$$P(i,T) = \Sigma_{l=1\ to\ L} A_l \Pi_l(i_l) + D_l(i_l, T_l)$$

wherein:
P(i, T) is the $i^{th}$ position of the pilot symbol when the selected transmission parameter is T;
$A_1, A_2, \ldots A_L$, are constants set in the design of the distribution pattern;
$\Pi_1(i_1), \Pi_2(i_2), \ldots \Pi_L(i_L)$, are lookup tables containing position values, all of which values are different; and
$D_1(i_1,T_1), D_2(2_1,T_2), \ldots D_L(i_L,T_L)$ are lookup tables containing dither values.

8. The method of claim 1, wherein the pilot symbols are modulated onto a single carrier wave and transmission parameters that are to be utilized by the receiver in processing the data symbols, and wherein the data symbols are modulated onto the single carrier wave and transmit data.

9. A receiver method for retrieving a selected transmission parameter from a digital signal modulated according to a single carrier modulation technique and comprising distinct pilot symbols and data symbols, the method comprising:
determining a sequence characteristic of the pilot symbols distributed amongst the data symbols included within a packet of the signal, the sequence characteristic being a function of the relative position of individual pilot symbols assigned to positions interleaved amongst the data symbols,
wherein the sequence characteristic is one of a plurality of patterns, each pattern associated with at least one of a plurality of transmission parameters, the sequence characteristic being independent of the modulation technique, and
retrieving the selected transmission parameter encoded in the pattern of the sequence characteristic.

10. The receiver method of claim 9, wherein the selected transmission parameter encoded in the characteristic is retrieved by making use of a stored lookup table.

11. A method for a receiver to process a digital signal, the signal being modulated according to a single carrier modulation technique and comprising distinct data symbols and a sequence of individual pilot symbols temporally distributed amongst the data symbols in a packet, the method including:
determining a characteristic of the sequence of pilot symbols, the characteristic being a function of the relative position of the individual pilot symbols assigned to positions interleaved amongst the data symbols,
wherein the sequence characteristic is one of a plurality of patterns, each pattern associated with at least one of a plurality of transmit parameters and being independent of the modulation technique;
recognizing the pattern;
retrieving the transmit parameter encoded in the sequence characteristic of the pilot symbols by the pattern; and
processing the signal using the retrieved transmit parameters.

12. The method of claim 11, wherein the transmit parameter is encoded in the temporal position of the pilot symbols constituting the sequence.

13. The method of claim 11, wherein the transmit parameter is encoded in the frequency of occurrence of the pilot symbols constituting the sequence.

14. The method of claim 11, wherein the characteristic of the pilot symbol sequence in which the transmit parameter is encoded is not the same as the characteristic in which the data symbols are encoded.

15. The method of claim 11, wherein the digital signal comprises a plurality of packets, each packet containing both pilot symbols and data symbols, the distribution of pilot symbols amongst the data symbols being prescribed in accordance with the transmit parameter to be encoded.

16. The method of claim 11, wherein the pilot symbols are distributed amongst the data symbols according to a fractal distribution pattern, wherein the pattern of distribution of pilot symbols is repeated at different length scales across the data stream of the signal.

17. A transmitter apparatus for communicating a selected transmission parameter in a digital signal modulated according to a single carrier modulation technique and comprising distinct data symbols and pilot symbols, the apparatus including:
an encoder that is configured to encode the selected transmission parameter in a sequence characteristic of the pilot symbols distributed amongst the data symbols within a packet, the sequence characteristic being a function of the relative position of individual pilot symbols assigned to positions interleaved amongst the data symbols,
wherein the sequence characteristic is one of a plurality of patterns, each pattern associated with at least one of a plurality of transmission parameters, the sequence characteristic being independent of the modulation technique, such that a receiver is able to determine the pattern of the sequence characteristic for the packet and thereby retrieve the selected transmission parameter.

18. The transmitter apparatus of claim 17, wherein the encoder is configured to encode the selected transmission parameter in the temporal position of the pilot symbols constituting the sequence.

19. A receiver apparatus for retrieving a selected transmission parameter from a digital signal modulated according to a single carrier modulation technique and comprising distinct data symbols and pilot symbols, the receiver apparatus including:
a digital signal processor configured to determine a sequence characteristic of the pilot symbols distributed amongst the data symbols included within a packet of the signal, the sequence characteristic being a function of the relative position of individual pilot symbols assigned to positions interleaved amongst the data symbols,
wherein the sequence characteristic is one of a plurality of patterns, each pattern associated with at least one of a plurality of transmission parameters, the sequence characteristic being independent of the modulation technique, to thereby retrieve the selected transmission parameter encoded in the sequence characteristic.

20. A receiver apparatus for processing a digital signal modulated according to a single carrier modulation technique and comprising distinct data symbols and a sequence of individual pilot symbols temporally distributed amongst the data symbols in a packet, the apparatus including:
means for determining a characteristic of the sequence of pilot symbols, the characteristic being a function of the relative position of the individual pilot symbols assigned to positions interleaved amongst the data symbols
wherein the sequence characteristic is one of a plurality of patterns, each pattern associated with at least one of a plurality of transmit parameters and being independent of the modulation technique;
means for retrieving transmit parameters encoded in the value of the pilot symbols; and
means for utilising the transmit parameters to process the signal.

* * * * *